UNITED STATES PATENT OFFICE 2,501,610

DIALLYL-3,5-DIMETHYLPHTHALATE POLYMER

Rupert C. Morris, Berkeley, and Alva V. Snider, Richmond, Calif., assignors to Shell Development Company, San Francisco, Calif., a corporation of Delaware No Drawing. Application October 23, 1944, Serial No. 560,044

6 Claims. (Cl. 260—78.4)

This invention relates to unsaturated esters and to methods for their production. More particularly, the invention pertains to the monomeric and polymeric esters of 3,5-dimethylphthalic acid with an alcohol which has a double bond of aliphatic character between two carbon atoms, one of which is directly attached to a saturated carbinol carbon atom and to methods for the production of the said monomeric and polymeric esters.

The compounds of the present invention are distinguishable from related compounds heretofore known to the art, e. g. diallylphthalate in that they have methyl groups substituted upon two of the nuclear carbon atoms of the benzene ring. It has been found that this structural difference imparts to the resulting unsaturated esters inherent properties which unexpectedly are markedly superior to the properties of the corresponding compounds which are not thus substituted. These unique properties could not be foreseen and they are of such a nature as to make the compounds of the invention particularly useful in many applications. The herein described diallyl-3,5-dimethylphthalates are, for example, liquids which polymerize either alone or in combination with other polymerizable substances to form polymers which are clear and of good color, and which have practically no odor. The homopolymer is not, as might be expected, a solid substance, but, instead, is a liquid which may be advantageously applied to many uses. It is, for example, an especially desirable coating agent which may be applied by dipping or brushing methods. When objects coated in this fashion are heated, the polymer bakes to a hard, impervious protective film. Since the polymer has superior adhesive properties it may be used as a valuable laminating agent for bonding a wide variety of natural and synthetic materials. It may also be used for impregnating porous substances. Because of their unique structure, the diallyl esters of the invention are compatible with or soluble in a variety of organic substances in which the related compounds heretofore known to the art are not soluble or with which they are not compatible. Thus, the presently described compounds are readily compatible with synthetic rubber and may be used as valuable softening agents therefor. They are particularly useful and desirable as constituents of hydrocarbon oil compositions, e. g. as lubricating oil additives, since they are readily miscible with or soluble in most hydrocarbon oils and impart thereto desirable physical characteristics and anti-wear properties.

As stated hereinabove, the compounds of the invention comprise the mono- and di-esters of 3,5-dimethylphthalic acid with an alcohol which has a double bond of aliphatic character between two carbon atoms, one of which is directly attached to a saturated carbinol carbon atom. These esters, which will be referred to hereinafter generically as allyl-type esters of 3,5-dimethylphthalic acid, have the general formula

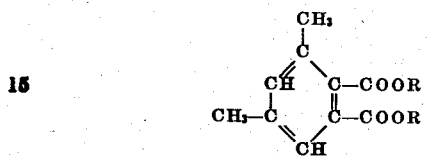

wherein at least one R represents a group derived from an allyl-type alcohol, i. e. an alcohol which has a double bond of aliphatic character between two carbon atoms, one of which is directly attached to a saturated carbinol atom. Such alcohols have an atomic grouping which may be represented by the general formula

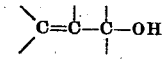

Examples of such groups are the allyl, methallyl, ethallyl, chloroallyl, bromoallyl, methoxyallyl, ethoxyallyl, cyanoallyl, hydroxyallyl, crotyl, tiglyl, cinnamyl, methylvinylcarbinyl, ethylvinylcarbinyl, n-propylvinylcarbinyl, isopropylvinylcarbinyl, dimethylvinylcarbinyl, methylethylvinylcarbinyl groups, etc., such groups containing 3 to 9 carbon atoms. Preferred radicals are the allyl, methallyl and crotyl radicals.

The other R group in the above general formula may also be a group of the type set forth in the above examples. It may also be any other type of unsaturated group such as, for example, a vinyl, isopropenyl, isobutenyl, cyclohexenyl group, etc., or an acetylenic group such as the propargyl group. The second R in the said formula may also be a saturated hydrocarbon group. Thus, it may be an alkyl group such as a methyl, ethyl, n-propyl, i-propyl, n-butyl, sec-butyl, i-butyl, amyl, hexyl, heptyl, or octyl group. It may also be a group of cycloaliphatic character, e. g. a cyclopentyl, methylcyclopentyl, cyclohexyl, or methylcyclohexyl group, or an aromatic group, e. g. a phenyl, tolyl, or xylyl group. Any of the aforementioned hydrocarbon groups may be substituted with suitable substituent atoms or groups, e. g. a halogen atom, such as a chlorine or bromine atom, a hydroxyl group, an alkoxy group, e. g. a methoxy group, a keto group, a cyano group, an amino group, etc.

Compounds which are representative of the compounds of the invention are monomeric and polymeric:

Monoallyl-3,5-dimethylphthalate
Monomethallyl-3,5-dimethylphthalate
Monoethallyl-3,5-dimethylphthalate
Monochloroallyl-3,5-dimethylphthalate
Monomethoxyallyl-3,5-dimethylphthalate
Monocrotylallyl-3,5-dimethylphthalate
Monotiglylallyl-3,5-dimethylphthalate
Monocinnamylallyl-3,5-dimethylphthalate
Allylmethyl-3,5-dimethylphthalate
Allylpropyl-3,5-dimethylphthalate
Methallylethyl-3,5-dimethylphthalate
Methallylbutyl-3,5-dimethylphthalate
Chloroallylmethyl-3,5-dimethylphthalate
Tiglylmethyl-3,5-dimethylphthalate
Cinnamylmethyl-3,5-dimethylphthalate
Allylcyclohexyl-3,5-dimethylphthalate
Allylphenyl-3,5-dimethylphthalate
Allylvinyl-3,5-dimethylphthalate
Allylisopropenyl-3,5-dimethylphthalate
Methallylvinyl-3,5-dimethylphthalate
Methallylisobutenyl-3,5-dimethylphthalate
Chloroallylpropargyl-3,5-dimethylphthalate
Methoxyallylcyclohexenyl - 3,5 - dimethylphthalate
Diallyl-3,5-dimethylphthalate
Dimethallyl-3,5-dimethylphthalate
Diethallyl-3,5-dimethylphthalate
Dichloroallyl-3,5-dimethylphthalate
Dimethoxyallyl-3,5-dimethylphthalate
Dihydroxyallyl-3,5-dimethylphthalate
Dicrotyl-3,5-dimethylphthalate
Dicinnamyl-3,5-dimethylphthalate
Allylmethallyl-3,5-dimethylphthalate
Allylethallyl-3,5-dimethylphthalate
Allylchloroallyl-3,5-dimethylphthalate
Allylcrotyl-3,5-dimethylphthalate
Methallylcrotyl-3,5-dimethylphthalate
Methallyltiglyl-3,5-dimethylphthalate
Methallylcinnamyl-3,5-dimethylphthalate
Ethallylchloroallyl-3,5-dimethylphthalate and the like. Preferred esters are those wherein the ester group or ester groups contain not more than four carbon atoms.

The novel esters of the invention may be prepared by any method suited to or adapted to the preparation of compounds of the described structural type. They may be readily prepared, for example, by the direct esterification of 3,5-dimethylphthalic acid or 3,5-dimethylphthalic anhydride with an allyl-type alcohol. This esterification reaction may be carried out under the conditions of temperature, presure and other reaction conditions customarily employed for the synthesis of unsaturated esters from suitable starting materials. It is preferred, however, to prepare the esters of the invention from more readily available starting materials, i. e. from 2-methylpentadiene-1,3, maleic anhydride, and an allyl-type alcohol. In accordance with this method 2-methylpentadiene-1,3 is reacted with maleic anhydride to form 3,5-dimethyl-1,2,3,6-tetrahydrophthalic anhydride. This anhydride is then dehydrogenated so as to form 3,5-dimethylphthalic anhydride, which is then reacted with an allyl-type alcohol to form an allyl ester. These reactions may be represented by the following equations wherein allyl alcohol itself is used as a representative allyl-type alcohol.

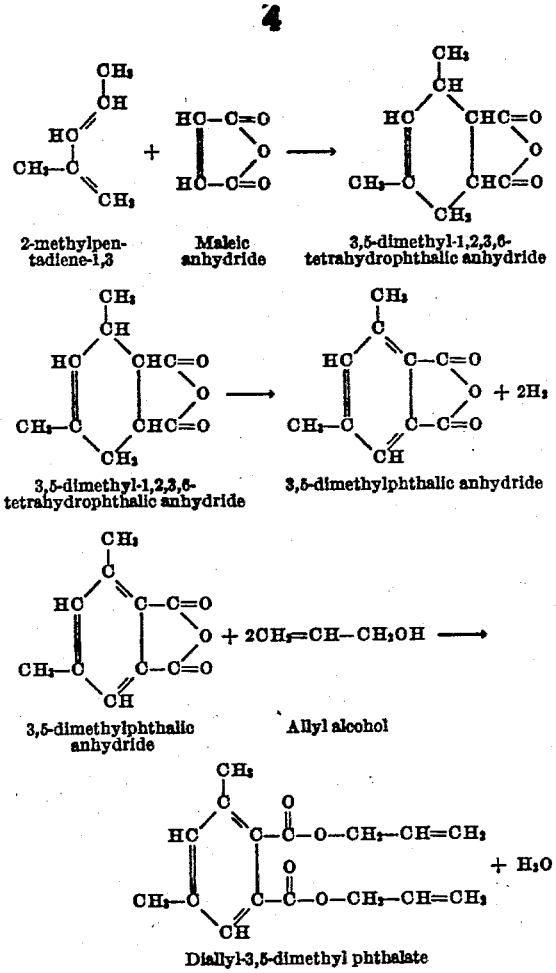

Representative unsaturated alcohols which may be employed in place of allyl alcohol in the above esterification step comprise methallyl alcohol, 2-methyl-3-ethyl allyl alcohol, 2-ethyl-3-propyl allyl alcohol, methyl vinyl carbinol, ethallyl alcohol, chloroallyl alcohol, penten-1-ol-3, hexen-1-ol-3, 3-methyl-buten-1-ol-3, 3-methyl-penten-1-ol-3, 2-methyl-buten-1-ol-3, 2-methyl-penten-1-ol-3, 2-3-dimethyl-buten-1-ol-3, hepten-1-ol-3, 4-methyl-hexen-1-ol-3, 5-methyl-hexen-1-ol-3, 4,4-dimethyl-penten-1-ol-3, octen-1-ol-3, 6-methyl-hepten-1-ol-3, 4-methyl-hepten-1-ol-3, 4,4 - dimethyl - hexen-1-ol-3, 3 - phenyl-propen-1-ol-3, 3-tolyl-propen - 1 - ol-3, 3-xylyl-propen-1-ol-3, 4 - phenyl-buten-1-ol-3, 4 - tolyl-buten-1-ol-3, 4-xylyl-buten-1-ol-3, 3-naphthyl-propen-1-ol-3, 4-chloro-buten-1-ol-3, pentadien-1,4-ol-3, hexen-1-yn-5-ol-3, 2-methyl-penten-1-yn-4-ol-3, and 2,5-dimethyl-hexadien-1,5-ol-4. Other allyl alcohols are crotyl alcohol, tiglyl alcohol, 3-chloro-buten-2 - ol - 1, cinnamyl alcohol, hexadien-2,4-ol-1, hexadien-2,5 - ol - 1, butadien-2,3-ol-1, hexadien-3,5-ol-2, 2-methyl-hexen-2-ol-1, 2-methyl - penten-2-ol-1, 3,7-dimethyl - octa-dien-2,7-ol-1, cyclopenten-2-ol-1, cyclohexen-2-ol-1, etc. Preferred allyl-type alcohols are the following having not more than 4 carbon atoms per molecule: allyl alcohol, methallyl alcohol, and crotyl alcohol.

The first of the above three reactions for the preparation of the esters of the invention, i. e. the production of the 3,5-dimethyltetrahydrophthalic anhydride, may be readily carried out by heating a mixture of approximately equimolecular proportions of maleic anhydride and 2-methylpentadiene-1,3 at a temperature sufficiently elevated to effect the addition of the olefin to the diolefin, thereby forming the desired cyclic anhydride. The reaction may be carried out, if desired, in the presence of a suitable solvent such as an aromatic hydrocarbon solvent, e. g. benzene. The adduct may be separated from the reaction mixture by any desired means, it being usually preferred to effect its separation by crystallization or by fractional distillation of the reaction product at subatmospheric pressure. The reaction temperature employed is variable depending upon the character of the starting materials employed and upon the other conditions of reaction, but may in general be between about 75° C. and about 125° C., preferably about 100° C. Somewhat higher temperatures may be employed, if desirable, however, as where the reaction is carried out at a superatmospheric pressure. The 3,5 - dimethyl - 1,2,3,6 - tetrahydrophthalic anhydride prepared as described above may be dehydrogenated by contacting it with a dehydrogenation catalyst under reaction conditions such as to bring about the removal of hydrogen from the tetrahydrobenzene ring and form the corresponding aromatic compound, i. e. 3,5-dimethylphthalic anhydride. Any suitable catalyst may be used for this purpose. Effective catalysts include nickel, platinum, palladium, chromium, copper chromite, nickel-on-alumina and the like. Active nickel is a preferred catalyst, especially nickel on a carrier such as pumice. Dehydrogenation temperatures which may be employed are in general temperatures which are between about the boiling or vaporizing temperature of the tetrahydrophthalic anhydride and its decomposition temperature. Reaction temperatures of between about 200° C. and about 400° C. are therefore suitable, a preferred range being between about 325° C. and about 375° C. The dehydrogenation may be carried out at atmospheric, subatmospheric or superatmospheric pressure. It may in some cases be desirable to effect the dehydrogenation under diminished pressure in order to minimize the decomposition of the materials charged to the dehydrogenator. Since the tetrahydrophthalic anhydride is a solid material which may solidify in the reactor used for the dehydrogenation, it is often desirable to dissolve the 3,5-dimethylphthalic anhydride in a suitable solvent before introducing it into the reactor. Suitable diluting materials are non-reactive solvents in which 3,5-dimethyltetrahydrophthalic anhydride is soluble such as the hydrocarbon solvents, particularly the aromatic hydrocarbon solvents. A preferred solvent comprises thiophene-free benzene which may be used in an amount which is about equal to the amount of anhydride charged. The dehydrogenation may be carried out in either a batch or continuous manner in any suitable type of apparatus. It is usually preferred to operate in a continuous manner by introducing a mixture of 3,5-dimethyl-1,2,3,6-tetrahydrophthalic anhydride and a diluent into a furnace which contains the catalyst, e. g. pellets of nickel on pumice, and which is equipped with means for regulating the temperature within a range of between about 250° C. and about 400° C. The gaseous reaction mixture leaving the furnace is then passed through a cooling device such as a condenser thereby separating the 3,5-dimethylphthalic anhydride from the gaseous constituents of the reaction product.

The esterification of the 3,5-dimethylphthalic anhydride prepared in this manner may be carried out by heating the said anhydride or the corresponding free acid with a suitable quantity of an allyl alcohol, e. g. allyl alcohol. The amount of alcohol to be used is largely determined by whether it is desired to prepare the monoester or the diester. When it is desired to prepare the monoester, an amount of alcohol should be used which is approximately equivalent to the amount of anhydride it is desired to esterify. However, when the diester is to be prepared approximately two equivalents of alcohol should be used for each equivalent of the cyclic anhydride. The esterification reaction is preferably carried out in the presence of a suitable esterification catalyst. Suitable catalysts are the mineral acids such as sulfuric acid, hydrochloric acid, phosphoric acid, etc., or certain of the organic acids such as benzene sulfonic acid, paratoluene sulfonic acid and the like.

It is obvious that since the unsaturated alcohols which are employed to esterify the cyclic anhydride or acid are capable of polymerization, as is the ester which is formed as a product of the reaction, the operating conditions must be regulated, when it is desired to prepare the monomeric ester, so as to favor the production of the monomer and to hinder the polymerization reactions. The esterification should therefore be carried out for relatively short operating periods and at temperatures which are not above those required to effect the desired reaction. It is also often advantageous to effect the reaction in the presence of a polymerization inhibitor such as tannic acid. The monomeric ester product may be separated from the esterification reaction mixture by fractional distillation under diminished pressure or by other suitable means, such as dissolving the acidic components of the reaction mixture in the dilute sodium carbonate solution.

Since the esterification of the methyl-substituted 3,5-dimethylphthalic acid or of its anhydrides with an allyl-type alcohol may in some cases be attended by concurrent polymerization of the unsaturated alcohol and/or of the unsaturated ester product, thus causing the occurrence of undesirable side reactions and consequent loss of product, it may be desirable to prepare the ally-type 3,5-dimethylphthalic acid esters of the invention by a process which does not require the direct esterification of the 3,5-dimethylphthalic acid or of its anhydride with an unsaturated alcohol. This may be accomplished in some cases by reacting 2-methylpentadiene-1,3 with an allyl-type ester of maleic acid and dehydrogenating the product. Thus, in the first step of this process diallyl-3,5-dimethyl-1,2,3,6-tetrahydrophthalate may be prepared by the simple condensation of 2-methylpentadiene-1,3 with diallyl maleate:

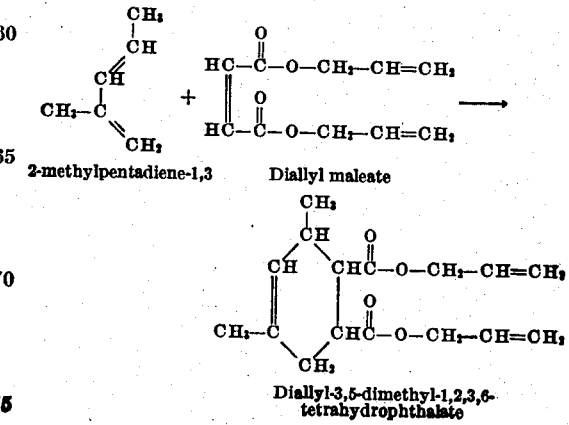

The above reaction may be carried out using substantially the same conditions as employed in the hereinabove outlined procedure for reacting 2-methylpentadiene-1,3 with maleic anhydride. It may usually be carried out, for example, by forming a mixture of the conjugated diene and an allyl-type ester of maleic acid, heating the said mixture at a reaction temperature, e. g. a reaction temperature of between about 75° C. and about 125° C., preferably 100° C., and separating the unsaturated ester product by any suitable method, as by fractional distillation of the reaction product under diminished pressure. This condensation reaction may be carried out at atmospheric or superatmospheric pressures and in the presence or absence of a solvent such as benzene or toluene.

The diallyl-3,5-dimethyl-1,2,3,6-tetrahydrophthalate prepared by this condensation may then be dehydrogenated to form diallyl-3,5-dimethylphthalate:

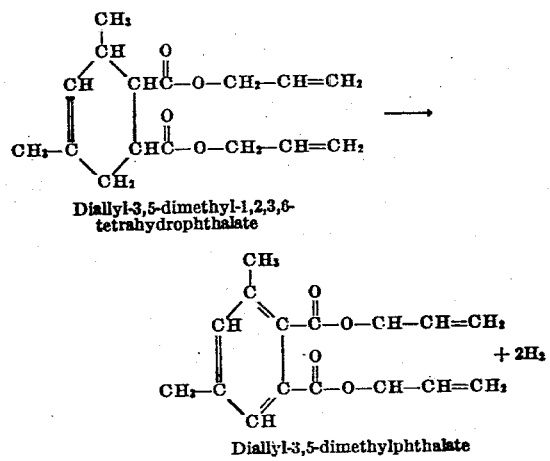

This reaction may be carried out using substantially the same conditions as are described hereinabove for the dehydrogenation of 3,5-dimethylphthalic anhydride. It may be carried out, for example, by contacting an allyl ester of 3,5-dimethyl-1,2,3,6-tetrahydrophthalic acid with a dehydrogenation catalyst at elevated temperatures. Suitable catalysts are, in general, active nickel, platinum, palladium, and the like. Finely divided nickel catalysts, particularly finely divided nickel supported by a carrier such as pumice, comprise preferred catalysts. Temperatures of up to about 400° C. may be employed, a temperature of from about 325° C. to about 375° C. being a preferred range. The dehydrogenation may be carried out at atmospheric, subatmospheric or superatmospheric pressures. A diluent may be employed if desired. Since the diallyl esters which are the starting materials for the dehydrogenation are capable of polymerization it is usually desirable or necessary to dehydrogenate under as mild reaction conditions as possible in order to prevent or inhibit the formation of a polymeric product. It may also be desirable to carry out the dehydrogenation in the presence of a polmerization inhibitor such as hydroquinone.

Thus, in one embodiment of the invention 2-methylpentadiene-1,3 may be mixed with maleic anhydride and the resulting mixture heated to a temperature of about 100° C. After maintaining the reaction mixture at this temperature for from three to five hours, the reaction mixture may be crystallized or distilled under diminished pressure in order to separate the 3,5-dimethyl-1,2,3,6-tetrahydrophthalic acid anhydride product. This product may then be dehydrogenated by contacting it with an active nickel catalyst at a temperature of between about 325° C. and about 375° C. thereby forming 3,5-dimethylphthalic anhydride. The anhydride prepared in this fashion may be converted to the diester, e. g. the diallyl ester, by forming a mixture comprising the said anhydride and an allyl-type alcohol, e. g. allyl alcohol, together with a small amount of an acid esterification catalyst such as paratoluene sulfonic acid. This mixture may then be heated at a reflux temperature, preferably under conditions such that water may be removed from the reaction mixture substantially as soon as it is formed, until approximately the theoretical amount of water has separated. The reaction product may then be distilled under diminished pressure, e. g. a pressure of between about 1 mm. and about 100 mm., thereby separating the ester product from the unreacted starting materials and from any polymeric materials which may have been formed as by-products of the reaction.

In another embodiment 2-methylpentadiene-1,3 may be mixed with an allyl-type ester of maleic acid, e. g. diallyl maleate, and the resulting mixture heated to a temperature of about 100° C. for a reaction time of about four hours. The reaction product may then be fractionally distilled in order to obtain the desired 3,5-methyl-1,2,3,6-tetrahydrophthalic acid ester. This ester may then be contacted with a dehydrogenation catalyst, e. g. an active nickel catalyst at a temperature of between about 325° C. and about 375° C. in order to effect its conversion to an allyl-type ester of 3,5-dimethylphthalic acid.

As stated, the invention extends also to the polymers of the herein disclosed allyl-type esters of the 3,5-dimethyl-1,2,3,6-tetrahydrophthalic acids. Also included are the co-polymers of these compounds with other polymerizable substances. The polymeric materials may be prepared from the monomeric esters by methods suitable for use in the polymerization of such substances, or they may be prepared directly from the raw materials which are used in the production of the monomeric ester by carrying out the reactions under conditions such that the polymer is produced rather than the monomer.

Typical co-polymerizable compounds are those containing in the molecule a single polymerizable olefinic linkage (>C=C<) such as styrene, vinyl halides, vinylidene halides, vinyl esters of saturated monocarboxylic acids, methyl acrylate, methyl methacrylate, allyl halides, allyl esters of saturated monocarboxylic acids, etc. Another important group consists of unconjugated polymerizable compounds having in the molecule two or more non-conjugated polymerizable unsaturated linkages such as unsaturated aliphatic polyesters of saturated poly-basic acids, polyesters of saturated polyhydric alcohols with unsaturated organic acids, and esters of unsaturated alcohols with unsaturated aliphatic acids. Other polymerizable unsaturated compounds are those containing in the molecule one or more polymerizable organic radicals and one or more inorganic radicals or elements as exemplified by the vinyl, allyl and methallyl esters of phosphoric acid and of the ortho acids of silicon, boron, etc. Another important group of copolymerizable compounds consists of those having in the molecule two or more, preferably two, conjugated unsaturated polymerizable carbon-to-carbon linkages such as conjugated butadiene, conjugated chlorobutadiene, isoprene, the other conjugated pentadienes, the conjugated hexadienes, their homologues, analogues and suitable substitution products. Other valuable co-polymers are those of the compounds of the invention with one or more allyl polyesters of polycarboxylic acids, particularly allyl polyesters of aromatic polycarboxylic acids, e. g. diallyl phthalate and the like and with allyl polyesters of ethereal oxygen-containing polycarboxylic acids, e. g. diallyl diglycolate.

The compounds of the invention can be polymerized and co-polymerized by oxygen-containing polymerization catalysts. Benzoyl peroxide has been found satisfactory for this purpose. Other polymerization catalysts are acetyl peroxide, benzoyl acetyl peroxide, lauryl peroxide, dibutyryl peroxide, succinyl peroxide, sodium peroxide, barium peroxide, tertiary alkyl hydroperoxides, such as tertiary butyl hydroperoxide, peracetic acid, perphthalic acid, sodium peroxide, perborates, persulfates, ozone and oxygen. The compounds can be polymerized in the presence of their own peroxides, or of their ozonides. Another class of polymerization catalysts consists of the di(tertiary alkyl) peroxides, notably di(tertiary butyl) peroxide. Metals and metallic salts may be used as polymerization catalysts. If desired, mixtures of polymerization catalysts can be used, a suitable mixture being that of benzoyl peroxide and hydrogen peroxide. In some cases it may be desirable to conduct the polymerization in the concurrent presence of both a catalyst and an inhibitor of polymerization. The amount of peroxide catalyst used will ordinarily be between about 0.01% and about 5%, although it is not necessarily limited to this range. In still other cases it may be unnecessary to use any catalyst at all.

Polymerization is usually energized by the application of heat, although both heat and light may be used, and in some cases, light alone may be sufficient. Temperatures of between about 60° C. and about 150° C. are preferred, although higher and lower temperatures can be used. The monomeric compounds can be polymerized in the massive state or as dispersions or solutions. Where a dispersion method is employed, it may be desirable to select a dispersing medium insoluble in the catalyst involved. With certain compounds polymerization can be effected in the vapor state. Continuous or discontinuous processes may be used. Atmospheric, reduced, or superatmospheric pressures may be used. Polymerization may be carried out under a blanket of an inert gas.

The polymerization reaction can be carried to completion without substantial interruption or it can be stopped at any point short of completion. Incomplete polymerization may be used for the production of a syrup comprising a mixture of monomer and polymer which may be further worked and eventually substantially completely polymerized. The syrup may, for instance, be transferred to a mold of any desired configuration and again subjected to polymerization conditions, or it may be used in coating operations, or in impregnating bibulous, e. g. fibrous, material, which in turn may be used in the production of laminates. Unreacted monomer may be separated from its mixture with polymer by solvent extraction, distillation or other methods. The separated polymer may then be worked up in any known or special manner. In the case of many compounds, particularly in the case of the polymerization of compounds having two or more non-conjugated polymerizable unsaturated linkages in the molecule, the separated polymer may be capable of further polymerization.

The polymers and co-polymers of the invention can be modified by admixture with other synthetic resins, natural resins, cellulose derivatives, and drying oils. Preferred modifiers are film-forming substances. Examples of synthetic resins in addition to polymers of the polymerizable unsaturated organic compounds illustrated hereinabove are alkyd resins, urea-aldehyde resins, phenol-aldehyde resins and synthetic linear super-polyamides and polyesteramides. There may also be present one or more plasticizers, stabilizers, lubricants, dyes, pigments, or fillers. Where the modifiers do not react with, or otherwise adversely affect, the ingredients of the reaction mixture, they may be added to the monomer or to the partially polymerized material. Where the modifiers are not added to the monomer, they can be incorporated with preformed polymer by grinding, mixing or milling on heated rolls, or by co-precipitation from a common solvent.

The invention is illustrated by the following examples:

Example I 142 parts of 3,5-dimethylphthalic acid and 232 parts of allyl alcohol were refluxed together with 373 parts of benzene and 4 parts of paratoluene sulfonic acid. The water which was formed during the reaction was separated by azeotropic distillation. Distillation of the reaction mixture after completion of the reaction resulted in the separation of 132 parts of diallyl-3,5-dimethylphthalate. This product has properties as follows:

B. P. 140–144° C. at 1 mm.
R. I. (20/D) 1.5080
Sp. gr. (20/4) 1.0854
Saponification value 0.766 eq./100 g. (theory 0.73).

Example II

Diallyl - 3,5 - dimethylphthalate was prepared from 2-methylpentadiene-1,3 and maleic anhydride by condensing 2-methylpentadiene-1,3 and maleic anhydride. This reaction was carried out by refluxing a molar excess of methylpentadiene with maleic anhydride, flash distilling the reaction mixture under reduced pressure when the reaction was complete thereby removing the excess methylpentadiene, and crystallizing the 3,5-dimethylphthalic anhydride product which melted at 54.0 to 55.5° C. The 3,5-dimethyl-1,2,3,6 - tetrahydrophthalic anhydride product prepared in this manner was dehydrogenated by passing it through a heated furnace packed with a nickel-on-pumice catalyst, the temperature being maintained at between about 325° C. and 375° C. Benzene was incorporated in the feed as required to maintain an even flow of the reactants through the furnace and avoid plugging of the feed lines. The product leaving the dehydrogenation furnace was condensed thereby separating the 3,5-dimethylphthalic anhydride.

This product was esterified with allyl alcohol substantially as described in Example I, i. e. by refluxing with allyl alcohol, benzene and paratoluene sulfonic acid, separating the water formed by the reaction substantially as soon as formed, and distilling the reaction product to separate the diallyl ester therefrom. This ester boiled at from 140° C. to 144° C. at 1 mm.

Example III

Diallyl-3,5-dimethylphthalate is prepared by reacting 2-methylpentadiene-1,3 with diallyl maleate thereby forming diallyl-3,5-dimethyl-1,2,3,6-tetrahydrophthalate, which is then dehydrogenated by contacting it with an active nickel catalyst at a temperature of about 325° C. to 375° C.

Example IV

Monoallyl-3,5-dimethylphthalate is prepared by condensing 2-methylpentadiene-1,3 with maleic anhydride, dehydrogenating the product over active nickel, and reacting the thus formed 3,5-dimethylphthalic anhydride with allyl alcohol using substantially equivalent amounts of allyl alcohol and 3,5-dimethylphthalic anhydride.

Example V

Dimethallyl-3,5-dimethylphthalate is prepared by condensing 2-methylpentadiene-1,3 with maleic anhydride thereby forming 3,5-dimethyl-1,2,3,6-tetrahydrophthalic anhydride, dehydrogenating the product over an active nickel catalyst, thereby forming 3,5-dimethylphthalic anhydride, which is then reacted with methallyl alcohol using at least two moles of methallyl alcohol for each mole of 3,5-dimethylphthalic anhydride.

Example VI

A polymer was prepared from diallyl-3,5-dimethylphthalate by forming a mixture of this compound with about 2% of benzoyl peroxide and heating the said mixture for three hours at 50° C., then for 84 hours at 70° C. and then for 24 hours at 90° C. An additional 4% of benzoyl peroxide was then added to the mixture which was again heated for 81 hours at 70° C. The polymer which was formed as a result of this treatment was a light yellow liquid of a mild, pleasant odor. When applied to solid objects and heated, it baked to a hard, clear film. It was readily soluble in hydrocarbon solvents particularly in lubricating oils.

We claim as our invention:

1. Diallyl-3,5-dimethylphthalate.
2. A polymer of diallyl-3,5-dimethylphthalate.
3. A method for the preparation of diallyl-3,5-dimethylphthalate which comprises condensing 2-methylpentadiene-1,3 with diallyl maleate at 75° C. to 125° C. and dehydrogenating the product by contact with an active nickel catalyst at 325° C. to 375° C.
4. A method for the production of an allyl ester of 3,5-dimethylphthalic acid which comprises reacting 2-methylpentadiene-1,3 with an allyl ester of maleic acid at 75° C. to 125° C. and dehydrogenating the product by contacting it with a dehydrogenation catalyst at 200° C. to 400° C.
5. A method for the production of an ester of 3,5-dimethylphthalic acid and an aliphatic, monohydric, beta,gamma-monoolefinic primary alcohol having 3 to 4 carbon atoms per molecule which comprises reacting 2-methylpentadiene-1,3 with an ester of maleic acid and said beta,gamma-monoolefinic alcohol at 75° C. to 125° C. and dehydrogenating the product by contacting it with a dehydrogenation catalyst at 200° C. to 400° C.
6. A method for the production of an ester of 3,5-dimethylphthalic acid and a beta,gamma-olefinic alcohol having 3 to 9 carbon atoms per molecule which comprises reacting 2-methylpentadiene-1,3 with an ester of maleic acid and a beta,gamma-olefinic alcohol having 3 to 9 carbon atoms per molecule at 75° C. to 125° C. and contacting the 3,5-dimethyl-1,2,3,6-tetrahydrophthalic acid ester of said beta,gamma-olefinic alcohol which is produced with a dehydrogenation catalyst at 200° C. to 400° C. to effect dehydrogenation thereof to the corresponding 3,5-dimethylphthalic acid ester.

RUPERT C. MORRIS.
ALVA V. SNIDER.

REFERENCES CITED

The following references are of record in the file of this patent:

UNITED STATES PATENTS

| Number | Name | Date |
| --- | --- | --- |
| 2,218,439 | Rothrock | Oct. 15, 1940 |
| 2,238,030 | Bradley | Apr. 15, 1941 |
| 2,249,768 | Kropa | July 22, 1941 |
| 2,273,891 | Pollack et al. | Feb. 24, 1942 |
| 2,391,226 | Clifford et al. | Dec. 18, 1945 |
| 2,433,616 | Marple et al. | Dec. 30, 1947 |

OTHER REFERENCES

Freund et al., article abstracted in Chem. Abstract, 10, 1331 (1916).

Rusicka, article abstracted in Chem. Abstract, 30, 6343 (1936).